(12) United States Patent
Archer

(10) Patent No.: US 10,477,015 B2
(45) Date of Patent: Nov. 12, 2019

(54) PROCESSING SMS MESSAGES

(71) Applicant: Metaswitch Networks Ltd., Enfield (GB)

(72) Inventor: Duncan Archer, Durham (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 16/240,605

(22) Filed: Jan. 4, 2019

(65) Prior Publication Data

US 2019/0230220 A1 Jul. 25, 2019

(30) Foreign Application Priority Data

Jan. 23, 2018 (GB) .................................. 1801119.7

(51) Int. Cl.
*H04W 8/18* (2009.01)
*H04M 3/42* (2006.01)
*H04L 12/58* (2006.01)
*H04W 4/14* (2009.01)
*H04M 7/00* (2006.01)

(52) U.S. Cl.
CPC ........ *H04M 3/42246* (2013.01); *H04L 51/22* (2013.01); *H04L 51/28* (2013.01); *H04L 51/36* (2013.01); *H04M 7/0081* (2013.01); *H04W 4/14* (2013.01)

(58) Field of Classification Search
CPC ........... H04M 15/723; H04M 15/8038; H04M 15/8083; H04M 2215/0188; H04M 2215/0192; H04M 15/43; H04M 15/49; H04M 15/61; H04M 15/64; H04M 15/745; H04M 15/83; H04M 15/8353; H04M 15/84; H04M 15/85; H04M 15/856; H04M 15/88; H04M 17/02; H04M 17/026;

(Continued)

(56) References Cited

U.S. PATENT DOCUMENTS

2006/0276226 A1* 12/2006 Jiang ..................... H04W 8/183
455/558
2007/0213050 A1* 9/2007 Jiang ...................... H04W 8/04
455/432.3

(Continued)

FOREIGN PATENT DOCUMENTS

EP        2637429 A1   9/2013
WO   2004086784 A1  10/2004
WO   2008088889 A1   7/2008

OTHER PUBLICATIONS

Combined Search and Examination Report dated Feb. 15, 2018 for GB Application No. GB1801119.7.

(Continued)

*Primary Examiner* — Quan M Hua
(74) *Attorney, Agent, or Firm* — EIP US LLP

(57) ABSTRACT

A first telephony identifier and a second telephony identifier are used for communication with a first, multi-identity user. Each of the first and second telephony identifiers are configured for use as different destination addresses in different SMS messages sent to the first user. At least one SMS message is processed in SMS processing equipment in the network, and the SMS processing equipment performs identity management, in relation to the use of the first and second telephony identifiers for the first user, during processing of the at least one SMS message.

17 Claims, 2 Drawing Sheets

(58) Field of Classification Search
CPC ...... H04M 17/10; H04M 17/103; H04M 3/38; H04M 3/436; H04M 7/0066; H04M 7/1235
See application file for complete search history.

(56) References Cited

U.S. PATENT DOCUMENTS

| | | | | |
|---|---|---|---|---|
| 2007/0243876 | A1* | 10/2007 | Duan | H04W 4/14 455/445 |
| 2013/0128801 | A1* | 5/2013 | Zhu | H04W 4/14 370/315 |
| 2015/0172884 | A1 | 6/2015 | Arazi et al. | |
| 2017/0339538 | A1 | 11/2017 | Yang et al. | |

OTHER PUBLICATIONS

Response to Examination Report dated May 18, 2018 for GB Application No. GB1801119.7.
No Further Objections dated May 23, 2018 for for GB Application No. GB1801119.7.

* cited by examiner

PROCESSING SMS MESSAGES

CROSS-REFERENCE TO RELATED APPLICATIONS

This application claims priority to GB Application No. GB 1801119.7, filed 23 Jan. 2018, under 35 U.S.C. § 119(a). The above-referenced patent application is incorporated by reference in its entirety.

BACKGROUND OF THE INVENTION

Field of the Invention

The present disclosure relates to processing Short Message Service (SMS) messages in a telephony network. In particular, but not exclusively, the present disclosure relates to methods, apparatuses and computer programs for use in processing SMS messages.

Description of the Related Technology

A user of a telephony network may have multiple different identities. For example, a multi-identity user may have a first identity for personal use and a second identity for business use. There may be scenarios in which the multi-identity user wishes to conduct messaging in relation to both identities using a single user device, for example so that the user need not carry both a personal user device and a business user device.

Users of messaging apps, for example Facebook™ and Whatsapp™, can have multiple identities, with messages to all identities delivered to a single app on a single user device, and selection of which identity to use when sending messages. However, such apps use various proprietary protocols which are not well integrated with the protocols and functionality of a telephony network. Such apps also operate as "walled gardens" and thus only those that use the app can message others, and in turn this requires use of a smartphone in order to access the service. Users of so-called feature phones do not get access to such messaging services. Furthermore, they require mobile data or WiFi™ connections to be active to send and receive messages.

SUMMARY

According to an aspect of the present invention, there is provided a method for processing communications in a telephony network, the method comprising:
  configuring a first telephony identifier and a second telephony identifier for communication with a first, multi-identity user, each of the first and second telephony identifiers being configured for use as different destination addresses in different SMS messages sent to the first user; and
  processing at least one SMS message in SMS processing equipment in the network; and
  performing identity management, in relation to the use of the first and second telephony identifiers for the first user, during processing of the at least one SMS message at the SMS processing equipment.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

A telephony network (also referred to as a 'telephone network') is a type of telecommunications network in which telephony services including voice calls (also referred to as 'telephone calls' or 'calls'), video calls and messaging services can be provided and such telephony services can be conducted between two or more users of the telephony network. Such users may be known as 'entities', 'parties', 'subscribers' or 'end users'.

Figure 1:
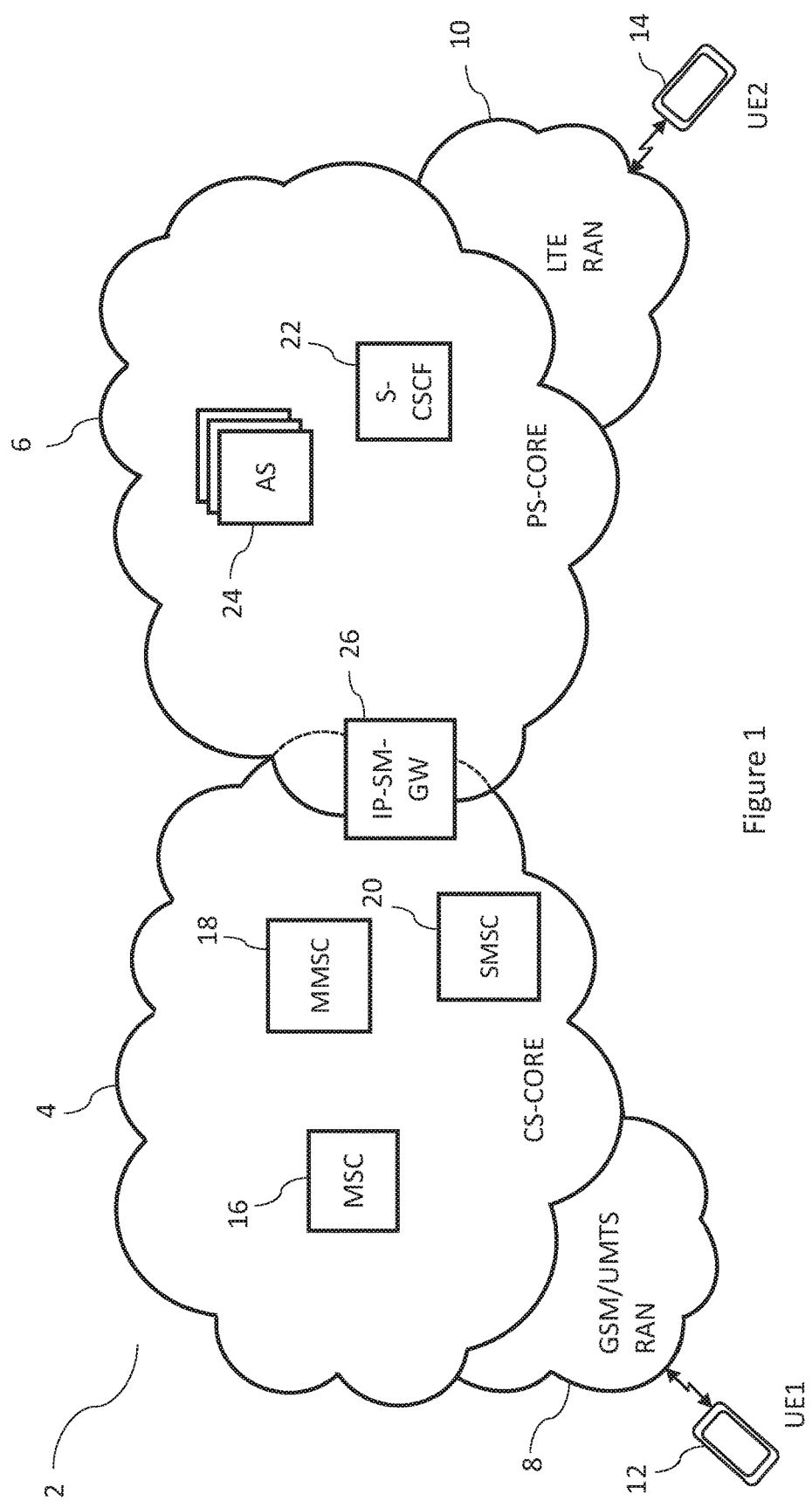
FIG. 1 shows a schematic block diagram representing an example of a telephony network.

In the example shown in FIG. 1, the telephony network 2 is a cellular telephony network which comprises a Circuit-Switched (CS) core network 4, a Packet-Switched (PS) core network 6, a Universal Mobile Telecommunications System (UMTS) Radio Access Network (RAN) 8 and a Long-Term Evolution (LTE) RAN 10. Users can communicate by means of apparatus in the form of user equipment connected via any of the radio access networks to the CS core network 4 and/or the PS core network 6. FIG. 1 shows first user equipment 12 and second user equipment 14, which may for example be smartphone devices and/or feature phone devices, and network-based telephony equipment. The network-based telephony equipment may be implemented on a given physical computing device or devices, and/or may be virtualised across a platform of computing devices. In this example, the CS core network 4 includes telephony equipment including a Mobile Switching Center (MSC) 16, a Multimedia Messaging Switch Center (MMSC) 18 and a Short Message Switching Center (SMSC) 20, connected via signalling links, not shown in FIG. 1, in the CS core network 4. The PS core network 6 includes telephony equipment in the form of a Serving-Call Session Control Function (S-CSCF) 22, and one or more Application Servers (AS) 24. The telephony network 2 further comprises gateway equipment in the form of an Internet Protocol Short Message Gateway (IP-SM-GW) 26, which is communicatively connected to telephony equipment within the CS-core network 4 and the PS-core network 6. The telephony network 2 in this example transmits messages between two or more users of the telephony network, including SMS messages and other message types such as Multimedia service (MMS) messages. The SMSC 20 and the IP-SM-GW 26 are examples of SMS processing equipment. It will be appreciated that, in reality, a telephony network may comprise more user equipment and/or more network telephony network equipment than in the example telephony network 2 shown in FIG. 1. Further, the telephony network may be connected to other cellular telephony networks, in which the user terminals may also access the messaging services described herein, and the public switched telephone network (PSTN).

The IP-SM-GW 26 may be SMS processing equipment which operates according to the 3GPP standards, inter alia 3GPP TS 24.341. The IP-SM-GW may implement transport-layer interworking for SMS messages transmitted between the CS core 4 and the PS core 6, for example according to the GSMA IR.92 version 9.0 specification. In this example, the IP-SM-GW 26 is a Metaswitch® Sentinel IP-SM-GW.

In this example, the PS core network 6 is an Internet Protocol Multimedia Subsystem (IMS) core network.

The first and second user equipment 12, 14 and/or the SMS processing equipment may comprise one or more processors and one or more memories. One or more computer programs comprising computer-readable instructions may be stored in the one or more memories. The one or more processors may be configured to execute the computer-readable instructions and perform at least some of the methods and techniques described herein as result.

In the examples described herein, the first and second user equipment 12, 14 are both user equipment (also referred to as 'endpoints', 'endpoint devices' and 'subscriber devices'), it being understood that one or both of the first and second user equipment 12, 14 may not be user devices. An example of a user equipment that is not a user device is a voicemail server. User equipment are used by users of the telephony network and may take various different forms. Examples of user equipment include, but are not limited to, mobile (also referred to as 'cellular') telephones, including smartphones and feature phones, tablet computing devices, laptop computing devices, desktop computing devices, in-vehicle entertainment systems and smart watches. In this example, the first user equipment 12 is associated with a first user and the second user equipment 14 is associated with a second, different user. In other examples, the first and second user equipment 12, 14 are associated with the same user.

In this example, the first user (associated with the first user equipment 12) is a multi-identity user. The first user has multiple identities, including first and second identities. The first user may have more than two identities. For example, the first user may have a first identity and one or more additional identities including, at least, a second identity. The first and second identities are associated with one or more telephony service providers. A telephony service provider provides a telephony service to the first user. Examples of telephony service providers include, but are not limited to, mobile network operators (MNOs) and virtual mobile network operators (VMNOs). The first and second identities of the first user may be associated with different telephony service providers (for example an MNO and a VMNO respectively). Alternatively, the first and second identities of the first user may be associated with the same telephony service provider as each other. The first user may have a first account associated with the first identity and a second account associated with the second identity. Both accounts may be with the same telephony service provider where the same telephony service provider is associated with the first and second identities, or the first account may be associated with the first telephony service provider and the second account may be associated with the second telephony service provider where the first and second accounts are associated with first and second telephony service providers respectively. Examples of telephony identifiers include, but are not limited to, telephone numbers, telephony service usernames and Session Initiation Protocol (SIP) Uniform Resource Indicators (URIs). The first and second accounts may be associated with the same type of telephony service, or may be associated with different types of telephony services. Examples of such telephony services include, but are not limited to, landline telephony services, mobile telephony services, mobile Voice over Internet Protocol (VoIP) telephony services and non-mobile VoIP telephony services.

The first identity may be a personal identity and the second identity may be a business identity. However, the first and second identities need not be personal and business identities respectively. For example, the first and second identities could both be personal identities, the first and second identities could both be business identities, the first identity may not be a personal identity and the second identity may not be a business identity.

The first user equipment 12, used by the first user to access the telephony network 2, is associated with a first telephony identifier $ID_A$ and a second telephony identifier $ID_B$. The second user equipment 14, used by the second user to access the telephony network 2, is associated with a third telephony identifier $ID_C$. Whilst one is shown connected via the CS core network 4 and another is shown connected via the PS core network 6, either of them may be connected via either network and may dynamically change the radio access they use depending on coverage in a current location of each respective user.

Figure 2:
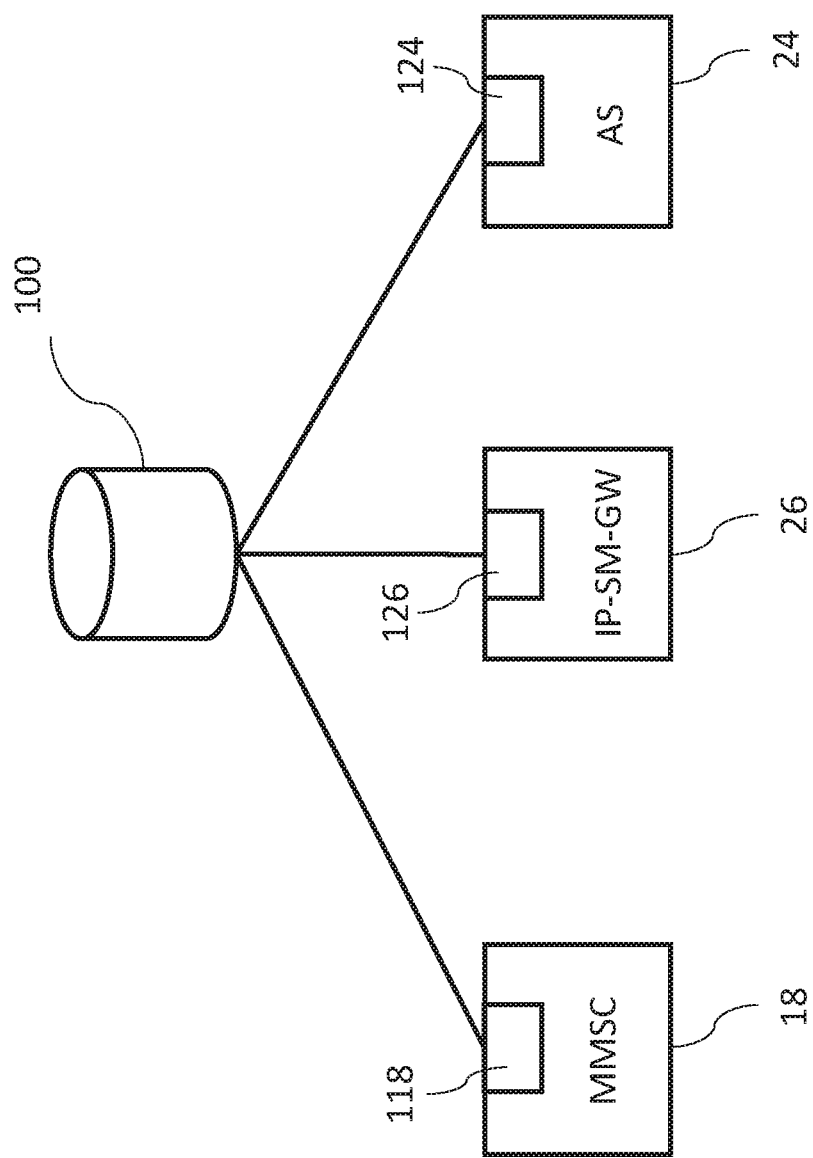
FIG. 2 shows a schematic block diagram representing another example of elements of a telephony network.

FIG. 2 shows an example of how telephony equipment in the telephony network 2 may be configured to implement methods in accordance with the present invention. The MMSC 18 includes an MMS identity management module 118. The AS 24 includes a call identity management module 124. The IP-SM-GW 26 includes an SMS identity management module 126. In this example, each of the MMSC 118, the AS 24, and the IP-SM-GW 26 is connected to an identity management database 100. In other examples, the identity management database 100 may be replaced with separate databases included as part of each of the MMSC 118, the AS 24 and the IP-SM-GW 26, which in such cases may be communicatively coupled such that the IP-SM-GW 26 is able to access data stored in the separate databases.

In an example of a method for processing communications in the telephony network 2, the first telephony identifier $ID_A$ and the second telephony identifier $ID_B$ are configured for use as different destination addresses in different SMS messages sent to the first user equipment 12. During processing of at least one SMS message at the SMS processing equipment, identity management is performed in relation to the first telephony $ID_A$ and the second telephony identifier $ID_B$.

In the example of FIG. 1, identity management is performed at the identity management module 126 of the IP-SM-GW 26, but in other examples, identity management may be performed by other SMS processing equipment, for example SMSC 20.

In the example of FIG. 1, the first and second telephony identifiers $ID_A$ and $ID_B$ are Mobile Station International Subscriber Directory Numbers (MSISDNs). In other examples, other forms of telephony identifier may be used.

According to an example of the method described above, performing identity management includes accessing stored data indicative of an association between at least one characteristic derivable from an SMS message and at least one of the first and second telephony identifiers $ID_A$ and $ID_B$, and selecting either the first telephony identifier $ID_A$ or the second telephony identifier $ID_B$ on the basis of the stored data. In the example of FIG. 2, the stored data is stored in the identity management database 100. Examples of a characteristic derivable from an SMS message are the time at which the SMS message was sent, the geographic location from which the SMS message was sent, and a third telephony identifier derived from a destination address of the SMS message. In some examples, the stored data is associated with a set of rules. One example of such a rule is: "if the characteristic indicates that an SMS message was sent between the hours of 9 am and 5 pm, select the first telephony identifier $ID_B$, otherwise select the second telephony identifier $ID_A$". In some examples several rules are applied in respect of the same telephony identifiers in a hierarchical manner, such that certain rules take priority over other rules. In some examples, rules are configurable by a user, for example by the user of the first user equipment 12. A user may configure rules via, for example a secure configuration web interface or a secure configuration app on a smartphone or tablet device.

In some examples, one of the characteristics derivable from an SMS message is derived during the processing of an SMS message at the SMS processing equipment. In one such example, referring to the FIG. 1, an SMS message originating at the first user equipment 12 is received by the IP-SM-GW 26. The IP-SM-GW 26 derives a characteristic from the received SMS message, and selects one of the first telephony identifier $ID_A$ and the second telephony identifier $ID_B$ on the basis of the derived characteristic and data stored in the identity management database 100. The IP-SM-GW 26 then transmits an outgoing SMS message including an originating address comprising the selected telephony identifier. In an example in which the first identifier $ID_A$ corresponds to a personal identity of the user of the first user equipment 12, and the second identifier $ID_B$ corresponds to a business identity of the user of the first user equipment 12, the rule: "if the characteristic indicates that an SMS message was sent between the hours of 9 am and 5 pm, select the first telephony identifier $ID_A$, otherwise select the second telephony identifier $ID_B$", ensures that the a receiver of the outgoing SMS message sent by the IP-SM-GW 26 perceives that the SMS message originated from the business identity if the message was sent during business hours, and otherwise perceives that the SMS message originated from the personal identity.

In some examples, the characteristic derived from an SMS message is a third telephony identifier derived from a destination address of the mobile-originating SMS message. In one example the third telephony identifier $ID_C$ is an identifier for the user of the second user equipment 14. In this example, the stored data is indicative of an association between the second telephony identifier $ID_B$ and the third telephony identifier $ID_C$, and the method includes selecting the second telephony identifier $ID_B$.

In some examples, the stored data includes communication data relating to the user of the first user equipment 12. In some examples, the communication data includes data indicative of one or more previous communications involving use of the second telephony identifier $ID_B$ and the third telephony identifier $ID_C$. Selecting a telephony identifier dependent on communication data as described may be used to ensure that the telephony identifier is selected consistently with a telephony identifier associated with a previous communication, as will be described hereafter with reference to further examples.

In some examples, the communication data includes data indicative of one or more previous voice and/or video calls involving use of the second telephony identifier $ID_B$ and the third telephony identifier $ID_C$ as telephony party identifiers. In these examples, during the previous voice and/or video calls, the communication data is sent from the call identity management module 124 of the AS 24 to the identity management database 100, where the data is stored. During processing of an SMS message, the IP-SM-GW 26 sends a request for stored data from the identity management database 100.

In an example, the communication data comprises data indicative of one or more previous voice and/or video calls involving use of the second telephony identifier as a called party identifier $ID_B$ and the third telephony identifier $ID_C$ as a calling party identifier. In another example, the communication data comprises data indicative of one or more previous voice and/or video calls involving use of the second telephony identifier as a calling party identifier and the third telephony identifier as a called party identifier.

In some examples in which the stored data comprises communication data relating to the user of the first user equipment 12, the communication data is indicative of one or more previous SMS messages involving use of the second telephony identifier $ID_B$ as a destination address and the third telephony identifier $ID_C$ as an originating address. In these examples, on receipt of the previous SMS message, the communication data is sent from the SMS identity management module 126 of the IP-SM-GW 26 to the identity management database 100, where the data is stored. During processing an SMS message, the IP-SM-GW 26 sends a request for stored data from the identity management database 100.

In some examples, processing the at least one SMS message at the SMS processing equipment includes receiving an incoming SMS message for which the second telephony identifier $ID_B$ is a destination address, and performing identity management includes delivering the incoming SMS message to the first user equipment 12 and updating the communication data on the basis of the incoming SMS message. Updating the communication data as described may be used to ensure that when a later SMS message is sent from the first user equipment 12 to the sender of the previous incoming SMS message, the second telephony identifier $ID_B$ is used as the originating address of the later SMS message.

Some examples in which the stored data includes communication data relating to the user of the first user equipment 12 further include processing voice and/or video calls using call processing equipment in the telephony network. The call processing in such examples includes receiving incoming call establishment signalling, the incoming call establishment signalling including the second telephony identifier $ID_B$ and the third telephony identifier $ID_C$ as telephony party identifiers, and performing call-based identity management during processing of the incoming call establishment signalling at the call processing equipment. Referring to FIG. 2, the call-based identity management in some examples is performed by the call identity management module 124 of the AS 24, and includes establishing a call and updating a call-related part of the communication data stored by the identity management database 100 on the basis of the incoming call establishment signalling.

In an example, the incoming call establishment signalling includes the second telephony identifier $ID_B$ as a called party identifier and the third identifier $ID_C$ as a calling party identifier, and performing call-based identity management includes establishing a call to the first user equipment 12, and updating the call-related part of the communication data on the basis of the incoming call establishment signalling. Updating the communication data as described may be used to ensure that when a later SMS message is sent from the first user equipment 12 to the previous calling party, the second telephony identifier $ID_B$ is used as the originating address of the later SMS message.

In an example, the incoming call establishment signalling includes the second telephony identifier $ID_B$ as a calling party identifier and the third identifier $ID_C$ as a called party identifier, and performing call-based identity management includes establishing a call to the second user equipment 14, and updating the call-related part of the communication data on the basis of the incoming call establishment signalling. Updating the communication data as described may be used to ensure that when a later SMS message is sent from the first user equipment 12 to the previous called party, the second telephony identifier $ID_C$ is used as the originating address of the later SMS message.

Some examples in which the stored data comprises communication data relating to the user of the first user equipment 12 further include processing MMS messages using MMS processing equipment in the telephony network 2. In such examples, the MMS message processing includes processing an incoming MMS message at the MMS message processing equipment, the incoming MMS message including the second telephony identifier $ID_B$ and the third telephony identifier $ID_C$ as one of a destination address and an originating address, respectively. Such examples further include performing MMS-based identity management during processing of the incoming MMS message at the MMS message processing equipment. Referring to FIG. 2, the MMS-based identity management in some examples is performed by the MMS identity management module 118 of the MMSC 18, and includes transmitting an MMS message to the first user equipment 12, or the second user equipment 14, and updating an MMS-related part of the communication data on the basis of the incoming MMS message. Updating the communication data as described may be used to ensure that when a later SMS message is sent from the first user equipment 12 to the sender of the previous incoming MMS message, the second telephony identifier $ID_B$ is used as the originating address of the later SMS message.

Some examples of methods according to the present invention include receiving a further SMS message from the first user, selecting to use the first telephony identifier $ID_A$ for the first user equipment 12 instead of the second telephony identifier $ID_B$, and transmitting an outgoing SMS message including an originating address that includes the first telephony identifier $ID_A$.

The above are to be understood as illustrative examples. Further examples are envisaged. For example, a multi-identity user may have more identities and have one or more telephony identifiers, other than the first telephony identifier and the second telephony identifier, managed by one or more identity management systems as described above.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A method for processing communications in a telephony network, the method comprising:
   processing at least one SMS message in SMS processing equipment in the telephony network, wherein first and second telephony identifiers are associated with a first, multi-identity user, and wherein each of the first and second telephony identifiers is useable as a destination address in an SMS message sent to the first user, wherein said processing at least one SMS message in the SMS processing equipment comprises:
     receiving a mobile-originating SMS message from the first user; and
     deriving a characteristic from the mobile-originating SMS message, wherein the derived characteristic is a third telephony identifier derived from a destination address of the mobile-originating SMS message, the third telephony identifier being an identifier for a second user; and
   performing identity management, in relation to the use of the first and second telephony identifiers for the first user, during said processing of the at least one SMS message at the SMS processing equipment, wherein said performing said identity management comprises:
     accessing stored data indicative of an association between at least one characteristic derivable from an SMS message and at least one of the first and second telephony identifiers; and
     selecting one of the first telephony identifier and the second telephony identifier on the basis of the derived characteristic and the stored data, wherein said selecting comprises, when the stored data is indicative of an association between the second telephony identifier and the third telephony identifier, selecting the second telephony identifier as the selected telephony identifier,
   wherein said processing at least one SMS message in the SMS processing equipment comprises:
     transmitting an outgoing SMS message, the outgoing SMS message including an originating address comprising the selected telephony identifier, and
   wherein the telephony network comprises a circuit-switched core, a packet-switched core and gateway equipment connecting the circuit-switched core and the packet-switched core, wherein the gateway equipment implements transport layer interworking for SMS messages transmitted between the packet-switched core and the circuit-switched core, and wherein the identity management is performed at the gateway equipment.

2. The method of claim 1, wherein the SMS processing equipment comprises an IP Short Message Gateway (IP-SM-GW).

3. The method of claim 1, wherein the first and second telephony identifiers are each MSISDNs.

4. The method according of claim 1, wherein the stored data comprises communication data relating to the first user, the communication data comprising data indicative of one or more previous communications involving use of the second telephony identifier and the third telephony identifier.

5. The method of claim 4, wherein the communication data comprises data indicative of one or more previous voice and/or video calls involving use of the second telephony identifier and the third telephony identifier as telephony party identifiers.

6. The method of claim 5, wherein the communication data comprises data indicative of one or more previous voice and/or video calls involving use of the second telephony identifier as a called party identifier and the third telephony identifier as a calling party identifier.

7. The method of claim 5, wherein the communication data comprises data indicative of one or more previous voice and/or video calls involving use of the second telephony identifier as a calling party identifier and the third telephony identifier as a called party identifier.

8. The method of claim 4, wherein the communication data is indicative of one or more previous SMS messages involving use of the second telephony identifier as a destination address and the third telephony identifier as an originating address.

9. The method of claim 6, wherein said processing the at least one SMS message at the SMS processing equipment comprises receiving an incoming SMS message, the incoming SMS message comprising the second telephony identifier as a destination address, and wherein said performing said identity management comprises:
   delivering the incoming SMS message to the first user and updating the communication data on the basis of the incoming SMS message.

10. The method of claim 4, wherein the method further comprises processing voice and/or video calls using call processing equipment in the telephony network, the call processing including:
 receiving incoming call establishment signalling, the incoming call establishment signalling including the second telephony identifier and the third telephony identifier as telephony party identifiers; and
 performing call-based identity management, during processing of the incoming call establishment signalling at the call processing equipment, comprising establishing a call and updating a call-related part of the communication data on the basis of the incoming call establishment signalling.

11. The method of claim 10, wherein the incoming call establishment signalling comprises the second telephony identifier as a called party identifier and the third telephony identifier as a calling party identifier, and wherein said performing call-based identity management comprises:
 establishing a call to the first user; and
 updating the call-related part of the communication data on the basis of the incoming call establishment signalling.

12. The method of claim 10, wherein the incoming call establishment signalling comprises the second telephony identifier as a calling party identifier and the third telephony identifier as a called party identifier, and wherein said performing call-based identity management comprises:
 establishing a call to the second user; and updating the call-related part of the communication data on the basis of the incoming call establishment signalling.

13. The method of claim 4, wherein the method further comprises processing MMS messages using MMS processing equipment in the telephony network, the MMS message processing including:
 processing an incoming MMS message at the MMS message processing equipment, the incoming MMS message including the second telephony identifier and the third telephony identifier as one of a destination address and an originating address, respectively; and
 performing MMS-based identity management, during processing of the incoming MMS message at the MMS message processing equipment, comprising transmitting an MMS message to the first user, or the second user, and updating an MMS-related part of the communication data on the basis of the incoming MMS message.

14. The method of claim 1, comprising:
 receiving a further SMS message from the first user;
 selecting to use the first telephony identifier for the first user instead of the second telephony identifier; and
 transmitting an outgoing SMS message, the outgoing SMS message including an originating address, the originating address comprising the first telephony identifier.

15. The method of claim 1, wherein the telephony network comprises an Internet Protocol Multimedia Subsystem (IMS) core.

16. An apparatus configured to process communications in a telephony network, the apparatus comprising:
 SMS processing equipment configured to process at least one SMS message, wherein first and second telephony identifiers are associated with a first, multi-identity user, and wherein each of the first and second telephony identifiers is useable as a destination address in an SMS message sent to the first user wherein said processing at least one SMS message in the SMS processing equipment comprises:
  receiving a mobile-originating SMS message from the first user; and
  deriving a characteristic from the mobile-originating SMS message, wherein the derived characteristic is a third telephony identifier derived from a destination address of the mobile-originating SMS message, the third telephony identifier being an identifier for a second user, and
 gateway equipment configured to perform identity management, in relation to the user of the first and second telephony identifiers for the first user, during said processing of the at least one SMS message at the SMS equipment, wherein said performing said identity management comprises:
  accessing stored data indicative of an association between at least one characteristic derivable from an SMS message and at least one of the first and second telephony identifiers; and
  selecting one of the first telephony identifier and the second telephony identifier on the basis of the derived characteristic and the stored data, wherein said selecting comprises, when the stored data is indicative of an association between the second telephony identifier and the third telephony identifier, selecting the second telephony identifier as the selected telephony identifier,
 wherein said processing at least one SMS message in the SMS processing equipment comprises:
  transmitting an outgoing SMS message, the outgoing SMS message including an originating address comprising the selected telephony identifier, and
 wherein the telephony network comprises a circuit-switched core, a packet-switched core and the gateway equipment, wherein the gateway equipment connects the circuit-switched core and the packet-switched core, wherein the gateway equipment implements transport layer interworking for SMS messages transmitted between the packet-switched core and the circuit-switched core.

17. A non-transitory computer-readable medium storing instructions that, when executed by one or more processors, perform the method of claim 1.

* * * * *